United States Patent [19]

Miranda et al.

[11] Patent Number: 4,658,149

[45] Date of Patent: Apr. 14, 1987

[54] METHOD AND APPARATUS FOR MEASURING THE DEPTH OF A FLOWING LIQUID

[76] Inventors: Ronald E. Miranda; Particia M. Miranda, both of 7003 O'Neill Dr., Amarillo, Tex. 79109

[21] Appl. No.: 766,529

[22] Filed: Aug. 19, 1985

[51] Int. Cl.[4] ............................................. G01F 23/28
[52] U.S. Cl. ....................................... 250/577; 73/293
[58] Field of Search ............... 250/573, 574, 576, 577; 73/293; 340/619

[56] References Cited

U.S. PATENT DOCUMENTS

| | | | |
|---|---|---|---|
| 2,980,802 | 4/1961 | Bracey et al. | 250/577 |
| 3,636,360 | 1/1972 | Oishi et al. | 73/293 |
| 4,015,128 | 3/1977 | Della Vedova | 250/577 |
| 4,443,699 | 4/1984 | Keller | 73/293 |

Primary Examiner—Edward P. Westin
Attorney, Agent, or Firm—Norman B. Rainer

[57] ABSTRACT

In a method and apparatus for measuring the depth of a flowing fluid, and controlling the flow rate of the fluid based upon the depth measurement, the fluid is caused to flow through a conduit, where it is irradiated with a known intensity of light, and the fluid is caused to fall from a horizontally directed exit terminus into a reservoir having a reflective bottom. The fluid serves as a wave guide for the light it received within the conduit, and releases the light within the reservoir. The intensity of light reflected from the bottom of the reservoir and emergent from the fluid is directly proportional to the depth of the fluid in the reservoir, and is measured by a photodetector which transmits a control signal to a valve in the conduit.

5 Claims, 1 Drawing Figure

METHOD AND APPARATUS FOR MEASURING THE DEPTH OF A FLOWING LIQUID

BACKGROUND OF THE INVENTION

This invention concerns the measurement of the depth of a flowing liquid, and control of the flow rate of said liquid based upon a depth measurement.

Various methods and apparatus have been utilized to measure the depth of fluids under static and dynamic conditions. Such methods generally involve mechanical principles or the attenuation of a calibrated energy source such as electromagnetic waves, sound or radioactivity. When a calibrated energy source is employed, the energy is caused to pass through the liquid which absorbs the energy in an amount linearly proportional to the path length through the liquid. The intensity of the emergent energy is measured and compared to the intensity of the input energy, whereby the liquid path length is determined. In the case of the use of visible light directed through a liquid, the measurable interrelationships are governed by the classic Lambert's law equation:

$$\log I/I_e = kd$$

where I is the intensity of the light transmitted at a given wavelength, Io is the intensity of the incident light, d is the thickness through which the light is transmitted, and k is the extinction coefficient for the particular liquid and wavelength.

In most techniques which utilize transmission of a calibrated energy source through a fluid system, the transmission characteristics of the windows which permit entrance and exit of the energy with respect to the confined liquid are subject to uncertain variation due to sedimentation effects and other factors.

Methods and apparatus for measuring liquid depth are generally not suitable for measuring or controlling the flow rate of the liquid.

It is accordingly an object of the present invention to provide a method for measuring the depth of a flowing liquid by attenuation of a calibrated source of electromagnetic energy.

It is another object of this invention to provide a method and implementing apparatus for measuring the depth of a flowing liquid with lessened dependence upon the transmission characteristics of windows.

It is a further object of the present invention to provide a method and apparatus of the aforesaid nature for measuring the depth of a flowing liquid and controlling the flow rate of said liquid.

It is still another object of this invention to provide an improved apparatus of the aforesaid nature of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by a method comprising:

(a) conducting a fluid through a conduit having a flow controlling device and downstream therefrom a window portion and further downstream a horizontally directed exit terminus, (b) directing a beam of light of known intensity onto said window portion, (c) permitting said fluid to fall by gravity from said exit terminus into a reservoir having a reflective flat bottom, (d) measuring the intensity of light reflected upwardly from said flat bottom, and converting said measured intensity into an electrical signal, and (e) causing said electrical signal to manipulate said flow controlling device.

The apparatus of the present invention is comprised of:

(f) a conduit having a flow controlling device and downstream therefrom a window portion, and further downstream a horizontally directed exit terminus, (g) means for directing a beam of light of controlled intensity onto said window portion, (h) a reservoir having a reflective flat bottom, said reservoir being positioned below said exit terminus, (i) means for measuring the intensity of light reflected upwardly from said flat bottom, (j) means for converting said measured intensity into an electrical signal, and (k) means for causing said electrical signal to manipulate said flow controlling device.

An important aspect of the method and apparatus of the present invention is that the liquid, in falling from the exit terminus of the conduit into the reservoir, serves as its own wave guide for transporting light from the conduit to the reservoir. By virtue of said wave guide aspect of the liquid, the several monitoring and control components are not in actual contact with the liquid. In preferred embodiments of the invention, the conduit is of circular cylindrical configuration, and the exit terminus is located closely downstream from the window portion.

The liquids which can be monitored by the present invention include aqueous and non-aqueous substances, pure liquids and solutions at various temperatures, and liquids carrying suspended particulate material.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
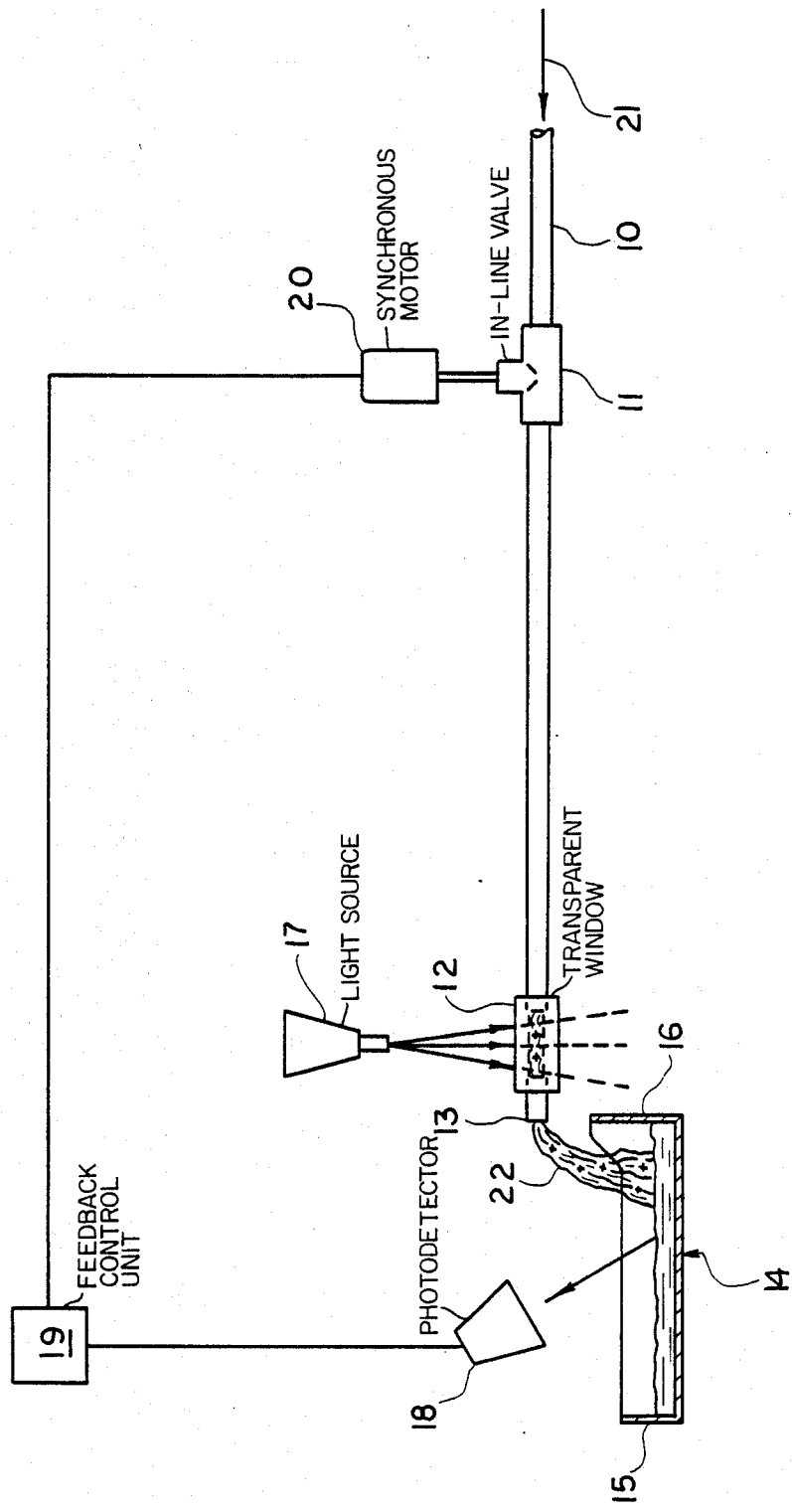
FIG. 1 is a schematic representation of a preferred embodiment of the apparatus of the present invention.

Referring to FIG. 1, apparatus useful in the practice of the present invention is shown comprised of horizontally disposed conduit 10 of circular tubular configuration having an in-line valve 11 and a transparent window portion 12 located downstream from said valve. An exit terminus 13 is located downstream from said window and closely adjacent thereto. A reservoir 14 is positioned below said exit terminus, said reservoir having a reflective flat bottom 15 and surrounding upright sidewalls 16.

A source of light energy of controllable intensity and wave length, designated by numeral 17 is positioned adjacent window portion 12. The light energy source is preferably of conventional design as typically employed in spectrophotometers, and is adapted to direct a collimated beam perpendicularly onto said window portion. Although shown as being located outside the liquid, the light source may in certain embodiments be positioned within conduit 10.

A photodetector device, designated by numeral 18, is positioned above said reservoir in a manner to sense light reflected upwardly from the flat bottom of the reservoir. The photodetector device is preferably of conventional design as typically employed in spectrophotometers. The photodetector generates an electrical potential which is fed into a feedback control unit designated by numeral 19. The feedback control unit amplifies the signal received from the photodetector, producing a a working electrical current. The working current is conducted to a synchronous motor 20 which turns valve 11 in a manner responsive to the magnitude of the working current. A calibration rheostat is associated with the feedback control unit in a manner such that, for a given electrical potential generated by the photodetector, the corresponding working current is of proper magnitude to correctly position valve 11. In alternative embodiments, the valve may be activated pneumatically in response to the working electrical current produced by the feedback control unit.

The area of flat bottom 15 is preferably between 1½ and 3 times the cross sectional area of exit terminus 13. Said flat bottom is preferably positioned between about 3 and 9 inches below the center axis of said exit terminus. The photodetector is preferably positioned so as to sense light reflected at an angle between 30° and 85° with respect to flat bottom 15. The window portion is preferably a glass or plastic tube matching the cross sectional configuration of the conduit.

By virtue of the arrangement of the various components, a flowing liquid, designated by numeral 21, is irradiated by light as it passes the window portion. In its downwardly curved trajectory 22, the liquid stream functions as its own waveguide, retaining the light. Upon entering the reservoir, the light is given up to the confining surfaces of the reservoir, whereupon a fixed fraction is reflected upwardly by flat bottom 15.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described our invention, what is claimed is:

1. A method for measuring the depth of a flowing fluid, and controlling the flow rate of said fluid based upon said depth measurement comprising:
    (a) conducting a fluid through a conduit having a flow controlling device, a window portion, and a substantially horizontally directed exit terminus,
    (b) directing a beam of light of known intensity onto said window portion,
    (c) permitting said fluid to fall by gravity from said exit terminus into a reservoir having a reflective flat bottom,
    (d) measuring the intensity of light reflected upwardly from said flat bottom, and converting said measured intensity into an electrical signal, and
    (e) causing said electrical signal to manipulate said flow controlling device.

2. Apparatus for measuring the depth of a flowing fluid, and controlling the flow rate of said fluid based upon said depth measurement comprising:
    (f) a conduit having a flow controlling device, a window portion, and a substantially horizontally directed exit terminus,
    (g) means for directing a beam of light of controlled intensity onto said window portion,
    (h) a reservoir having a reflective flat bottom, said reservoir being positioned below said exit terminus,
    (i) means for measuring the intensity of light reflected upwardly from said flat bottom,
    (j) means for converting said measured intensity into an electrical signal, and
    (k) means for causing said electrical signal to manipulate said flow controlling device.

3. The method of claim 1 whereby the fluid, in falling from the exit terminus of the conduit into the reservoir serves as its own wave guide for transporting light from the conduit to the reservoir, and the measured intensity of the reflected light is directly proportional to the depth of fluid in the reservoir.

4. The apparatus of claim 2 wherein said means for measuring the intensity of the reflected light is positioned above said reservoir.

5. The apparatus of claim 4 wherein said conduit is a pipe of circular cross section.

* * * * *